US009818041B2

United States Patent
Mutch et al.

(10) Patent No.: US 9,818,041 B2
(45) Date of Patent: Nov. 14, 2017

(54) HIGH SECURITY KEY SCANNING SYSTEM

(71) Applicant: HY-KO PRODUCTS COMPANY, Northfield, OH (US)

(72) Inventors: William R. Mutch, North Ridgeville, OH (US); Thomas F. Fiore, Willowick, OH (US); Randall A. Porras, Avon, OH (US); Chester O. D. Thompson, Painesville, OH (US)

(73) Assignee: HY-KO PRODUCTS COMPANY, Northfield, OH (US)

( * ) Notice: Subject to any disclaimer, the term of this patent is extended or adjusted under 35 U.S.C. 154(b) by 0 days.

(21) Appl. No.: 15/227,619

(22) Filed: Aug. 3, 2016

(65) Prior Publication Data
US 2017/0039447 A1    Feb. 9, 2017

Related U.S. Application Data

(60) Provisional application No. 62/200,208, filed on Aug. 3, 2015.

(51) Int. Cl.
   *B23C 3/35*     (2006.01)
   *G06K 9/00*    (2006.01)
   (Continued)

(52) U.S. Cl.
   CPC .............. *G06K 9/4671* (2013.01); *B23C 3/35* (2013.01); *G06K 9/2027* (2013.01);
   (Continued)

(58) Field of Classification Search
   CPC ... B23C 3/35; B23C 2235/41; B23C 2235/32; G06K 9/2036
   See application file for complete search history.

(56) References Cited

U.S. PATENT DOCUMENTS

| 40,480 A | 3/1863 | Hill |
| 288,300 A | 11/1883 | Borowsky |

(Continued)

FOREIGN PATENT DOCUMENTS

| CH | 673612 | 3/1990 |
| DE | 2951065 | 7/1981 |

(Continued)

OTHER PUBLICATIONS

M. Cheewanantakul and S. Kiatsunthorn, "Duplicate a key using image processing," 2008 SICE Annual Conference, Tokyo, 2008, pp. 40-44. doi: 10.1109/SICE.2008.4654619.*

*Primary Examiner* — Utpal Shah
(74) *Attorney, Agent, or Firm* — McDonald Hopkins LLC

(57) ABSTRACT

A high security key scanning system and method is provided. The scanning system may comprise a sensing device configured to determine information and characteristics of a master high security key, and a digital logic to analyze the information and characteristics of the master key. The sensing device may be configured to capture information about the geometry of features cut into the surface of the master key. The logic may analyze the information related to that geometry and compare it to known characteristics of that style of high security key in order to determine the data needed to replicate the features on a new high security key blank. The system may be configured to capture the surface geometry using a camera or other imaging device. The system may utilize object coating techniques, illumination techniques, filtering techniques, image processing techniques, and feature extraction techniques to capture the desired features.

27 Claims, 14 Drawing Sheets

(51) Int. Cl.
*G06K 9/46* (2006.01)
*G06K 9/20* (2006.01)
*H04N 5/225* (2006.01)
*B23P 15/00* (2006.01)

(52) U.S. Cl.
CPC ......... *G06K 9/2036* (2013.01); *H04N 5/2256* (2013.01); *B23C 2235/41* (2013.01); *B23P 15/005* (2013.01); *G06K 2009/2045* (2013.01)

(56) References Cited

U.S. PATENT DOCUMENTS

| | | |
|---|---|---|
| 466,044 A | 12/1891 | Jacobs |
| 943,806 A | 12/1909 | Billings |
| 1,059,545 A | 4/1913 | Kunze |
| 1,081,472 A | 12/1913 | Tucker |
| 1,135,676 A | 4/1915 | Engelbert |
| 1,218,653 A | 3/1917 | Heldrich |
| 1,367,280 A | 2/1921 | Reiges |
| 1,390,958 A | 9/1921 | Hulbert |
| 1,440,459 A | 1/1923 | Greff |
| 1,628,637 A | 5/1927 | Shaw |
| 1,656,295 A | 1/1928 | Schechter |
| 1,674,291 A | 6/1928 | Malone |
| 1,702,488 A | 2/1929 | Baird |
| 1,750,218 A | 3/1930 | Falk |
| 1,752,668 A | 4/1930 | Johnson |
| 1,775,921 A | 9/1930 | Williams |
| 1,848,046 A | 3/1932 | Caron |
| 1,889,461 A | 11/1932 | Hansen |
| 1,923,164 A | 8/1933 | Roos |
| 1,948,260 A | 2/1934 | Fowler |
| 1,961,516 A | 6/1934 | Hansen |
| 1,978,628 A | 10/1934 | Hansen |
| 1,991,151 A | 2/1935 | Hansen |
| 2,032,820 A | 3/1936 | Turrell |
| 2,038,949 A | 4/1936 | Mintz |
| 2,098,728 A | 11/1937 | McPhee |
| 2,105,099 A | 1/1938 | Schuyler |
| 2,114,597 A | 4/1938 | Goddard |
| 2,148,668 A | 2/1939 | Yoskowitz et al. |
| 2,176,106 A | 10/1939 | Segal |
| 2,274,012 A | 2/1942 | Swayze et al. |
| 2,325,541 A | 7/1943 | Poole |
| 2,329,269 A | 9/1943 | Jacobi |
| 2,386,816 A | 10/1945 | Scholz |
| 2,430,924 A | 11/1947 | Fowle et al. |
| 2,445,041 A | 7/1948 | Scholz |
| 2,499,124 A | 2/1950 | Zipp et al. |
| 2,556,577 A | 6/1951 | Drake |
| 2,582,012 A | 1/1952 | Currier |
| 2,605,294 A | 7/1952 | Barnhart |
| 2,622,485 A | 12/1952 | Martellotti |
| 2,645,978 A | 7/1953 | Sejarto et al. |
| 2,707,335 A | 5/1955 | Falk |
| 2,728,251 A | 12/1955 | Turner |
| 2,860,884 A | 11/1958 | Sloan et al. |
| 2,929,177 A | 3/1960 | Sheps |
| 2,940,183 A | 6/1960 | Fromberg |
| 3,053,149 A | 9/1962 | Rossetti |
| 3,094,039 A | 6/1963 | Spain |
| 3,138,999 A | 6/1964 | Haggstrom |
| 3,172,969 A | 3/1965 | Haggstrom |
| 3,245,149 A | 4/1966 | Haggstrom |
| 3,257,908 A | 6/1966 | Haggstrom |
| 3,259,022 A | 7/1966 | Vietorisz |
| 3,276,328 A | 10/1966 | Schreiber et al. |
| 3,286,596 A | 11/1966 | Lieptz |
| 3,286,597 A | 11/1966 | Schwartz |
| 3,305,100 A | 2/1967 | Barbee |
| 3,323,420 A | 6/1967 | Roxburgh |
| 3,388,619 A | 6/1968 | Schreiber et al. |
| 3,418,882 A | 12/1968 | Brand |
| 3,424,056 A | 1/1969 | Stolove et al. |
| 3,429,207 A | 2/1969 | John |
| 3,430,535 A | 3/1969 | Haggstrom |
| 3,440,906 A | 4/1969 | Allen |
| 3,442,174 A | 5/1969 | Weiner et al. |
| 3,457,831 A | 7/1969 | Adler et al. |
| 3,466,747 A | 9/1969 | Patriquin et al. |
| 3,496,636 A | 2/1970 | Lieptz |
| 3,499,366 A | 3/1970 | Spain |
| RE26,848 E | 4/1970 | Simon |
| 3,599,147 A | 8/1971 | Rogers et al. |
| 3,602,092 A | 8/1971 | Richens |
| 3,625,111 A | 12/1971 | Carlo et al. |
| 3,633,451 A | 1/1972 | Lieptz |
| 3,651,573 A | 3/1972 | Kaplan |
| 3,656,402 A | 4/1972 | French |
| 3,675,536 A | 7/1972 | Hungerford, Jr. et al. |
| 3,682,041 A | 8/1972 | Essig |
| 3,707,999 A | 1/1973 | Coats |
| 3,722,341 A | 3/1973 | Hungerford, Jr. et al. |
| RE27,665 E | 6/1973 | Spain |
| 3,769,865 A | 11/1973 | Kleist |
| 3,773,360 A | 11/1973 | Timbers |
| 3,792,639 A | 2/1974 | Richens et al. |
| 3,795,174 A | 3/1974 | Oliver et al. |
| 3,796,130 A | 3/1974 | Gartner |
| 3,807,276 A | 4/1974 | Oliver |
| 3,810,416 A | 5/1974 | Nelms, Jr. |
| 3,826,555 A | 7/1974 | Matsumoto |
| 3,848,235 A | 11/1974 | Lewis et al. |
| 3,865,011 A | 2/1975 | Patriquin |
| 3,870,895 A | 3/1975 | Lax et al. |
| 3,880,047 A | 4/1975 | Dosier |
| 3,884,121 A | 5/1975 | Agius |
| 3,902,382 A | 9/1975 | Lieptz |
| 3,919,589 A | 11/1975 | Hanak |
| 3,919,920 A | 11/1975 | Schlage |
| 3,945,298 A | 3/1976 | Cockroft |
| 3,955,179 A | 5/1976 | Planke |
| 3,956,968 A | 5/1976 | Crasnianski |
| 3,978,764 A | 9/1976 | Patriquin |
| 3,981,214 A | 9/1976 | Wich |
| 4,012,991 A | 3/1977 | Uyeda |
| 4,019,415 A | 4/1977 | Wich |
| 4,023,464 A | 5/1977 | Zion |
| 4,051,748 A | 10/1977 | Sherman |
| 4,062,261 A | 12/1977 | Stahl |
| 4,088,060 A | 5/1978 | Johns |
| 4,090,303 A | 5/1978 | Uyeda |
| 4,092,806 A | 6/1978 | Wich |
| 4,105,340 A | 8/1978 | Kempf |
| 4,117,763 A | 10/1978 | Uyeda |
| 4,121,292 A | 10/1978 | Galanis et al. |
| 4,132,151 A | 1/1979 | Weber |
| D251,365 S | 3/1979 | Lipinski |
| 4,143,582 A | 3/1979 | Heimann |
| 4,166,949 A | 9/1979 | Pold et al. |
| 4,171,161 A | 10/1979 | Jung |
| 4,172,632 A | 10/1979 | Holmes, Jr. |
| 4,188,163 A | 2/1980 | Juskevic |
| 4,223,791 A | 9/1980 | Taggart |
| 4,233,746 A | 11/1980 | Troillet |
| D257,758 S | 1/1981 | Limacher |
| 4,251,173 A | 2/1981 | Saucedo |
| 4,256,423 A | 3/1981 | Juskevic |
| 4,281,379 A | 7/1981 | Austin |
| 4,283,859 A | 8/1981 | Roland |
| 4,294,096 A | 10/1981 | Heimann |
| 4,300,042 A | 11/1981 | Oldenkamp et al. |
| 4,300,170 A | 11/1981 | Sakamoto |
| 4,300,836 A | 11/1981 | Holmes et al. |
| 4,301,373 A | 11/1981 | Sjodin |
| 4,354,780 A | 10/1982 | Bougiouris |
| 4,359,299 A | 11/1982 | Sagarian |
| 4,373,414 A | 2/1983 | Agius |
| 4,426,179 A | 1/1984 | Jefferson |
| 4,432,142 A | 2/1984 | Korsak |
| 4,433,487 A | 2/1984 | Roland |
| 4,437,150 A | 3/1984 | Dahlgren, Jr. et al. |
| 4,453,432 A | 6/1984 | Widen |
| 4,468,994 A | 9/1984 | Lieptz |

(56) References Cited

U.S. PATENT DOCUMENTS

| | | |
|---|---|---|
| 4,472,056 A | 9/1984 | Nakagawa et al. |
| 4,479,673 A | 10/1984 | Inaba et al. |
| 4,521,142 A | 6/1985 | Juskevic |
| 4,525,908 A | 7/1985 | Bernstein |
| 4,526,498 A | 7/1985 | Fieldhouse |
| 4,541,760 A | 9/1985 | Zoueki |
| 4,545,569 A | 10/1985 | Schroder et al. |
| 4,551,046 A | 11/1985 | Kinas |
| 4,553,844 A | 11/1985 | Nakagawa et al. |
| 4,557,488 A | 12/1985 | Litherland |
| 4,558,215 A | 12/1985 | Kaneko et al. |
| 4,562,759 A | 1/1986 | Schmitt |
| 4,592,683 A | 6/1986 | Wu |
| 4,601,185 A | 7/1986 | Sheldon |
| 4,614,465 A | 9/1986 | Wu |
| 4,625,107 A | 11/1986 | Planke |
| 4,638,567 A | 1/1987 | Leversee |
| 4,647,028 A | 3/1987 | Yang |
| 4,648,585 A | 3/1987 | Yang |
| 4,651,604 A | 3/1987 | Almblad et al. |
| 4,652,738 A | 3/1987 | Nishihara et al. |
| 4,652,765 A | 3/1987 | Nishihara |
| 4,653,104 A | 3/1987 | Tamura |
| 4,656,590 A | 4/1987 | Ace |
| 4,657,448 A | 4/1987 | Alexander |
| 4,666,351 A | 5/1987 | Marchal |
| 4,671,711 A | 6/1987 | Steinbach et al. |
| 4,677,835 A | 7/1987 | Almblad |
| 4,679,331 A | 7/1987 | Koontz |
| 4,687,389 A | 8/1987 | Santii et al. |
| 4,697,300 A | 10/1987 | Warlop |
| 4,710,808 A | 12/1987 | Hoogenboom et al. |
| 4,717,294 A | 1/1988 | Grasser |
| 4,741,652 A | 5/1988 | Marchal |
| 4,767,110 A | 8/1988 | Yang |
| 4,780,032 A | 10/1988 | Uyeda et al. |
| 4,783,829 A | 11/1988 | Miyakawa et al. |
| 4,803,371 A | 2/1989 | Durland |
| 4,805,224 A | 2/1989 | Koezuka et al. |
| 4,809,341 A | 2/1989 | Matsui et al. |
| 4,821,200 A | 4/1989 | Oberg |
| 4,821,393 A | 4/1989 | Spigarelli |
| 4,839,913 A | 6/1989 | Annis et al. |
| 4,845,764 A | 7/1989 | Ueda et al. |
| 4,848,116 A | 7/1989 | Lizotte |
| 4,853,866 A | 8/1989 | Andrada Galan et al. |
| 4,868,559 A | 9/1989 | Pinnow |
| 4,898,504 A | 2/1990 | Agius et al. |
| 4,899,391 A | 2/1990 | Cimino et al. |
| 4,909,892 A | 3/1990 | Quinn et al. |
| 4,929,129 A | 5/1990 | Dickson |
| 4,929,843 A | 5/1990 | Chmielewski, Jr. et al. |
| 4,941,335 A | 7/1990 | Allen |
| 4,969,782 A | 11/1990 | Castain |
| 4,971,489 A | 11/1990 | Womack |
| 4,993,291 A | 2/1991 | Sopko |
| 4,998,349 A | 3/1991 | Killeen |
| 5,029,459 A | 7/1991 | Almblad |
| 5,043,144 A | 8/1991 | Gordon et al. |
| 5,056,204 A | 10/1991 | Bartschi |
| 5,058,940 A | 10/1991 | Hart |
| 5,083,759 A | 1/1992 | Pollak et al. |
| 5,088,864 A | 2/1992 | Yanagida |
| 5,094,538 A | 3/1992 | Reedman et al. |
| 5,096,346 A | 3/1992 | Ueda |
| 5,111,056 A | 5/1992 | Yoshimura et al. |
| 5,119,190 A | 6/1992 | Lemelson |
| 5,122,018 A | 6/1992 | Zion |
| 5,127,532 A | 7/1992 | Cimino et al. |
| 5,128,531 A | 7/1992 | Fadel |
| 5,130,064 A | 7/1992 | Smalley et al. |
| 5,139,246 A | 8/1992 | Yakou |
| 5,144,561 A | 9/1992 | Soper |
| 5,146,689 A | 9/1992 | Roland |
| 5,165,315 A | 11/1992 | Terada |
| 5,167,171 A | 12/1992 | Heredia |
| 5,171,112 A | 12/1992 | Roland |
| 5,192,469 A | 3/1993 | Smalley et al. |
| 5,201,203 A | 4/1993 | Almblad |
| 5,229,619 A | 7/1993 | Van Amstel |
| 5,244,321 A | 9/1993 | Sopko |
| 5,255,199 A | 10/1993 | Barkman et al. |
| 5,259,708 A | 11/1993 | Brice |
| 5,271,698 A | 12/1993 | Heredia et al. |
| 5,293,687 A | 3/1994 | Willoughby, Jr. et al. |
| 5,307,151 A | 4/1994 | Hof et al. |
| 5,308,360 A | 5/1994 | Neitzke et al. |
| 5,311,286 A | 5/1994 | Pike |
| 5,311,756 A | 5/1994 | Villani |
| 5,311,758 A | 5/1994 | Neitzke et al. |
| 5,314,274 A | 5/1994 | Heredia et al. |
| D348,393 S | 7/1994 | Neitzke et al. |
| 5,330,168 A | 7/1994 | Enomoto et al. |
| 5,351,409 A | 10/1994 | Heredia |
| 5,360,299 A | 11/1994 | Oliana |
| 5,363,463 A | 11/1994 | Kleinerman |
| 5,365,812 A | 11/1994 | Harnden |
| 5,382,784 A | 1/1995 | Eberhardt |
| 5,393,967 A | 2/1995 | Rice et al. |
| 5,416,591 A | 5/1995 | Yoshimura et al. |
| 5,429,202 A | 7/1995 | Millard et al. |
| 5,441,369 A | 8/1995 | Foscan et al. |
| 5,443,339 A | 8/1995 | Heredia et al. |
| 5,485,399 A | 1/1996 | Saigo et al. |
| 5,496,138 A | 3/1996 | Drori |
| 5,497,888 A | 3/1996 | Michaels et al. |
| 5,503,785 A | 4/1996 | Crump et al. |
| 5,515,903 A | 5/1996 | Hronas et al. |
| 5,538,374 A | 7/1996 | Cole et al. |
| 5,543,103 A | 8/1996 | Hogan et al. |
| 5,545,367 A | 8/1996 | Bae et al. |
| 5,552,992 A | 9/1996 | Hunter |
| 5,555,176 A | 9/1996 | Menhennett et al. |
| 5,556,240 A | 9/1996 | Almblad |
| 5,583,443 A | 12/1996 | McMurtry et al. |
| 5,592,728 A | 1/1997 | Susnjara |
| 5,594,652 A | 1/1997 | Penn et al. |
| 5,607,267 A | 3/1997 | Heredia et al. |
| 5,617,323 A | 4/1997 | Stansberry et al. |
| RE35,518 E | 5/1997 | Sussina |
| 5,630,332 A | 5/1997 | Aldieri et al. |
| 5,660,509 A | 8/1997 | Cole et al. |
| 5,671,523 A | 9/1997 | Juchinewicz |
| 5,676,504 A | 10/1997 | Mueller et al. |
| 5,677,522 A | 10/1997 | Rice et al. |
| 5,711,643 A | 1/1998 | Parr et al. |
| 5,739,766 A | 4/1998 | Chaloux |
| 5,764,156 A | 6/1998 | Chaloux |
| 5,771,176 A | 6/1998 | Froehlich et al. |
| 5,807,042 A | 9/1998 | Almblad et al. |
| 5,855,836 A | 1/1999 | Leyden et al. |
| 5,886,775 A | 3/1999 | Houser et al. |
| 5,906,365 A | 5/1999 | Wu |
| 5,908,273 A | 6/1999 | Titus et al. |
| 5,926,388 A | 7/1999 | Kimbrough et al. |
| 5,940,229 A | 8/1999 | Baumgarten |
| 5,964,554 A | 10/1999 | Drori |
| 5,966,457 A | 10/1999 | Lemelson |
| 5,982,491 A | 11/1999 | Breyer et al. |
| 5,984,597 A | 11/1999 | Chen |
| 5,997,224 A | 12/1999 | Beauregard et al. |
| 5,997,795 A | 12/1999 | Danforth et al. |
| 6,053,677 A | 4/2000 | Juchinewicz |
| 6,059,495 A | 5/2000 | Mueller et al. |
| 6,064,747 A | 5/2000 | Wills et al. |
| 6,065,911 A * | 5/2000 | Almblad ............... B23C 3/35 250/202 |
| 6,082,580 A | 7/2000 | Mueller et al. |
| 6,094,953 A | 8/2000 | Evans |
| 6,152,662 A | 11/2000 | Titus et al. |
| 6,175,638 B1 | 1/2001 | Yanovsky |
| 6,179,531 B1 | 1/2001 | Jaw |
| 6,185,311 B1 | 2/2001 | Yanovsky et al. |
| 6,186,711 B1 | 2/2001 | Mueller |

(56) References Cited

U.S. PATENT DOCUMENTS

| | | |
|---|---|---|
| 6,243,960 B1 | 6/2001 | Andrews et al. |
| 6,321,430 B1 | 11/2001 | Goldman et al. |
| D455,104 S | 4/2002 | Hillman et al. |
| 6,406,227 B1 | 6/2002 | Titus et al. |
| 6,415,931 B1 | 7/2002 | Mueller |
| 6,449,381 B1 | 9/2002 | Yanovsky et al. |
| 6,478,515 B1 | 11/2002 | Mueller |
| 6,543,972 B1 | 4/2003 | Cimino |
| 6,588,995 B2 | 7/2003 | Wills et al. |
| 6,602,030 B1 | 8/2003 | Markbreit |
| 6,612,142 B1 | 9/2003 | Capwell |
| 6,641,339 B2 | 11/2003 | Chies et al. |
| 6,647,308 B1 | 11/2003 | Prejean |
| 6,687,565 B2 | 2/2004 | Wetterlin et al. |
| 6,711,557 B1 | 3/2004 | Palaniappan |
| 6,801,829 B2 | 10/2004 | Kawai |
| 6,817,814 B2 | 11/2004 | Mueller |
| 6,836,553 B2 | 12/2004 | Campbell et al. |
| 6,839,449 B1 | 1/2005 | Campbell et al. |
| 6,839,451 B2 | 1/2005 | Campbell et al. |
| 6,895,100 B1 | 5/2005 | Pacenzia et al. |
| 6,959,862 B2 | 11/2005 | Neumark |
| 6,965,911 B1 | 11/2005 | Coffman et al. |
| 7,010,498 B1 | 3/2006 | Berstis |
| 7,114,436 B1 | 10/2006 | Mueller |
| 7,114,894 B2 | 10/2006 | Mueller et al. |
| 7,163,364 B2 | 1/2007 | Foscan et al. |
| 7,214,011 B2 | 5/2007 | Ryai, Sr. et al. |
| 7,484,446 B1 | 2/2009 | Gula |
| 7,643,685 B2 | 1/2010 | Miller |
| 7,890,878 B2 | 2/2011 | Bass et al. |
| 7,891,919 B2 | 2/2011 | Bass et al. |
| 7,918,629 B2 | 4/2011 | Belflower et al. |
| 8,128,322 B2 | 3/2012 | Bass et al. |
| 8,532,809 B2 | 9/2013 | Freeman |
| 8,585,029 B2 | 11/2013 | Ryai, Sr. |
| 8,634,655 B2 | 1/2014 | Thompson et al. |
| 8,644,619 B2 | 2/2014 | Thompson et al. |
| 9,101,990 B2 | 8/2015 | Mutch et al. |
| 9,199,318 B2 | 12/2015 | Freeman |
| 2001/0033781 A1 | 10/2001 | Wills et al. |
| 2001/0056385 A1 | 12/2001 | Timms et al. |
| 2002/0031251 A1 | 3/2002 | Campbell et al. |
| 2002/0168241 A1 | 11/2002 | David et al. |
| 2002/0191849 A1* | 12/2002 | Campbell ............... B23C 3/35 382/181 |
| 2003/0145499 A1 | 8/2003 | Tarter et al. |
| 2003/0154135 A1 | 8/2003 | Covington et al. |
| 2003/0205070 A1 | 11/2003 | Chaum |
| 2004/0024486 A1* | 2/2004 | Almblad ............... B23C 3/35 700/185 |
| 2004/0036595 A1 | 2/2004 | Kenny et al. |
| 2004/0095380 A1 | 5/2004 | Bass et al. |
| 2004/0253067 A1 | 12/2004 | Bosch |
| 2005/0000052 A1 | 1/2005 | Byles |
| 2005/0216120 A1 | 9/2005 | Rosenberg et al. |
| 2006/0003676 A1 | 1/2006 | Bernard et al. |
| 2006/0147289 A1 | 7/2006 | Gimelfarb et al. |
| 2007/0224008 A1 | 9/2007 | Bass et al. |
| 2007/0234614 A1 | 10/2007 | Tarter et al. |
| 2008/0252551 A1 | 10/2008 | Kubo et al. |
| 2009/0074528 A1 | 3/2009 | Hadad |
| 2009/0180664 A1 | 7/2009 | Efstathiades et al. |
| 2011/0262240 A1 | 10/2011 | Mutch et al. |
| 2012/0243957 A1* | 9/2012 | Drake .................... B23C 3/35 409/81 |
| 2015/0049181 A1* | 2/2015 | Grice .................... E05B 19/04 348/86 |

FOREIGN PATENT DOCUMENTS

| | | |
|---|---|---|
| EP | 0053730 | 10/1981 |
| EP | 0133091 | 2/1985 |
| EP | 0835720 | 4/1998 |
| EP | 1976656 | 10/2014 |
| ES | 2017240 | 1/1991 |
| FR | 2499435 | 8/1982 |
| GB | 2276106 | 9/1994 |
| JP | 59201708 | 11/1984 |
| JP | 6331108 | 12/1988 |
| JP | 6331109 | 12/1988 |
| JP | 4250911 | 9/1992 |
| MX | 291113 | 1/2007 |
| WO | 90/03867 | 4/1990 |
| WO | 91/13535 | 9/1991 |
| WO | 96/19309 | 6/1996 |
| WO | 01/57472 | 8/2001 |
| WO | 0201480 | 1/2002 |
| WO | 2005042196 | 5/2005 |
| WO | 2007087389 | 8/2007 |
| WO | 2012096685 | 7/2012 |

* cited by examiner

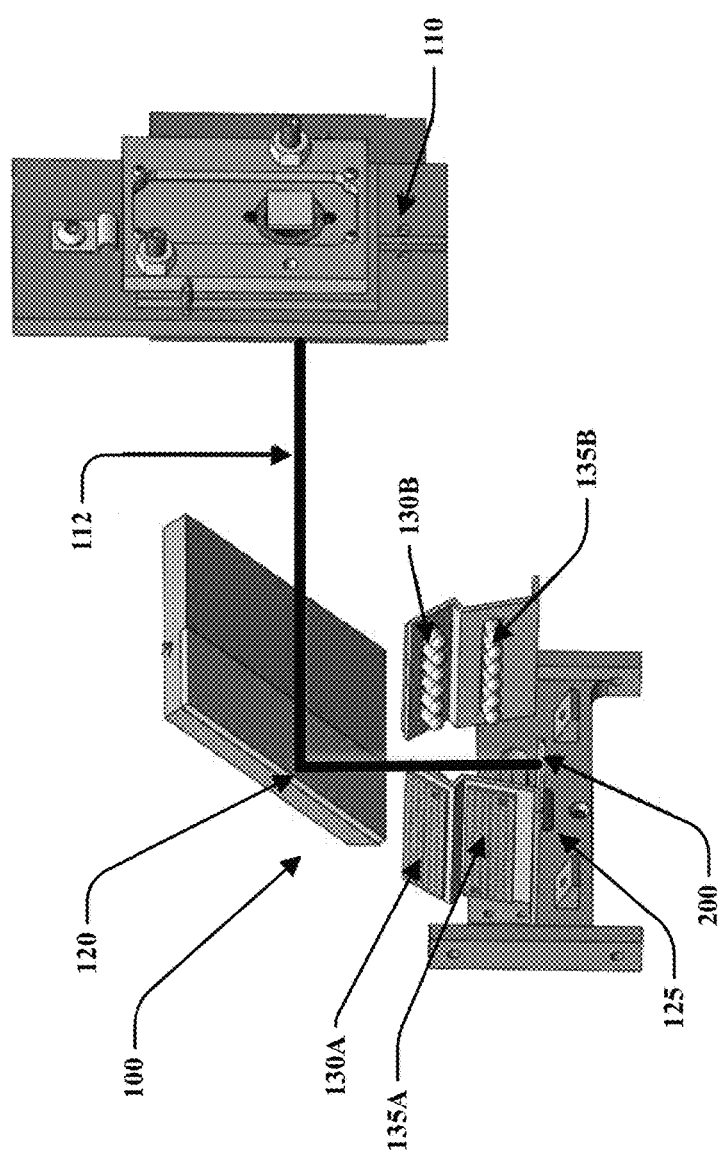
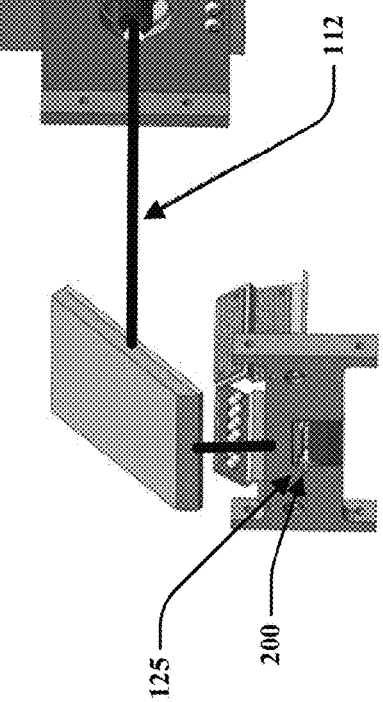
FIG. 4A
FIG. 4B

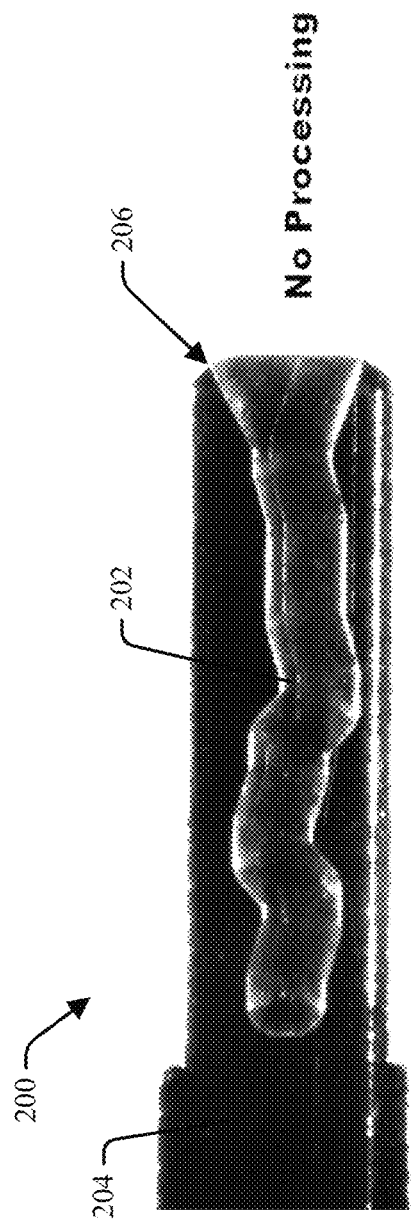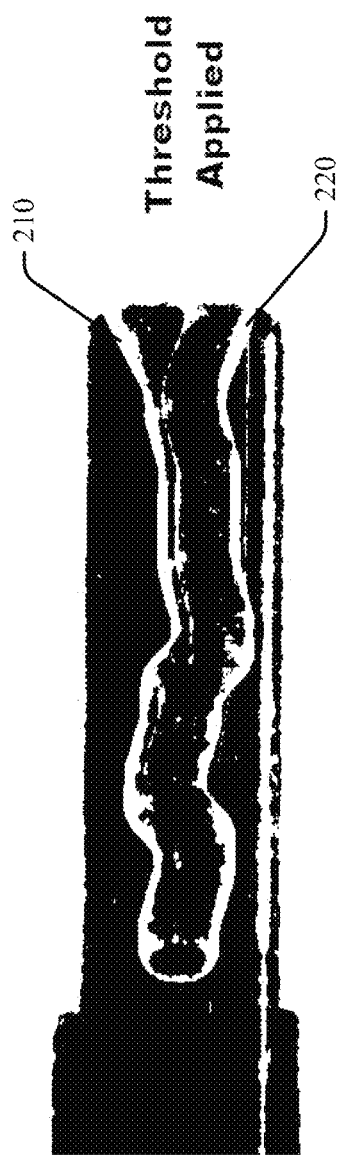
FIG. 9A
FIG. 9B

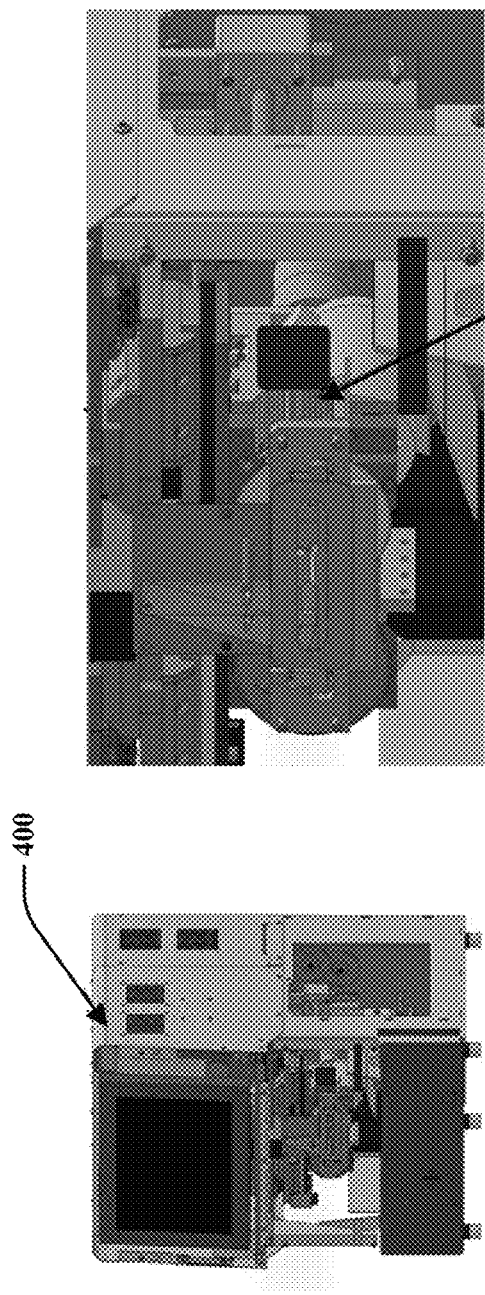
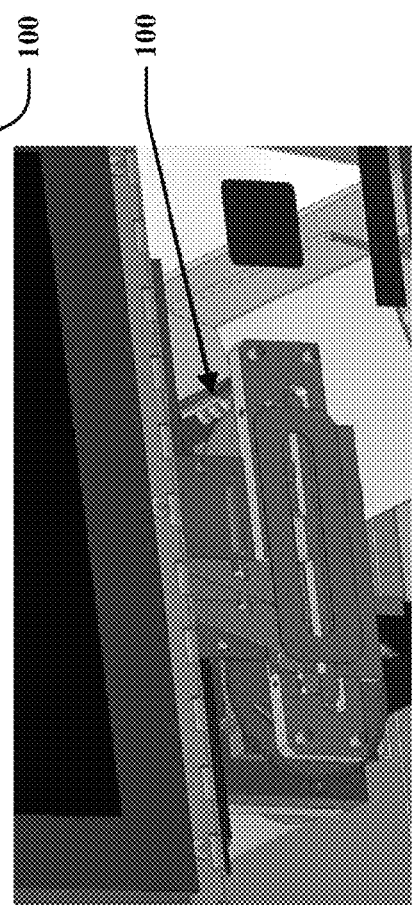
FIG. 12A
FIG. 12B
FIG. 12C

HIGH SECURITY KEY SCANNING SYSTEM

CROSS-REFERENCE TO RELATED APPLICATION

This application claims priority to U.S. Provisional Patent Application No. 62/200,208, entitled "High Security Key Scanning System" filed on Aug. 3, 2006 which is incorporated by reference in its entirety.

FIELD OF ART

This invention relates generally to apparatus and methods for duplicating keys, and more specifically, this invention relates to an apparatus and methods for utilizing electronic means for reading the unique features cut into the surface of the blade of a key such as a high security key and optionally providing that data to a key duplicating machine.

BACKGROUND OF THE INVENTION

The art of key replication for standard single-sided and double-sided keys is well known. Commonly, a key intended for duplication (the master key) is copied onto an appropriately identified key-blank utilizing any number of different systems known in the art. There are, however, a wide range of high security lock and key types where the lock is specifically designed to be difficult to pick and the key is specifically designed to be difficult to duplicate. As such, the process for duplicating high security keys is typically quite complicated and requires expensive and complicated key cutting equipment. In addition, successful duplication of high security keys usually requires a high degree of precision in order properly operate the lock. Because of all of these constraints, the successful duplication of high security keys typically also requires a highly trained and experienced person such as a locksmith.

There are many different types of high security locks and keys. For example, some require that the bitting cuts in the blade are cut at different compound angles. These angled cuts make duplication impossible on standard key duplication equipment. Others types of high security keys include unique surface features that are cut into the key blade that do not completely penetrate the blade of the key such as internal cut, sidewinder (also known as a laser cut), dimple, and sidebar keys. Again, such cuts make duplication impossible on standard key duplication equipment. Yet other types of high security keys utilize an electronic transponder to authenticate the key. Such electronics requires specialized equipment to read and duplicate the transponder function. There are also types of high security keys that utilize non-standard blade geometries such as cruciform, tubular, and other unique blade styles. The geometries and cut styles of these keys all require specialized duplicating equipment. There are many variations of all of these types and other types of high security locks and keys as they have been produced by many different lock manufacturers over the years. Some even utilize more than one type of high security feature in order to claim an even higher level of security.

Duplication of high security keys has been limited to mostly the locksmith market due to all of the complexities, the wide variety of expensive duplication equipment, and the in depth experience and knowledge required. Due to these same reasons, other businesses that offer retail key cutting services, such as hardware stores, home improvement stores, and automotive parts stores, are not able to offer these services. Systems that reduce the cost of the equipment and reduce the skill level required for duplicating high security keys would be very valuable to the retail key duplication industry.

SUMMARY

A high security key scanning system is provided. The scanning system comprises a sensing device configured to determine information and characteristics of a master high security key, and a digital logic to analyze the information and characteristics of the master key. The sensing device may be configured to capture information about the geometry of features cut into the surface of the master key. The logic may analyze the information related to that geometry and compare it to known characteristics of that style of high security key in order to determine the data needed to replicate the features on a new high security key blank.

In an embodiment, the system may be configured to measure the surface geometry using an imaging system, such as a camera or other imaging device. The system may utilize object coating techniques, illumination techniques, filtering techniques, image processing techniques, and feature extraction techniques to measure the desired features.

In one embodiment, as illustrated by the Figures, provided is a high security key scanning system comprising an imaging device configured to capture at least one image of a portion of a first side of a blade of a high security master key. A first light source may be positioned to direct light at a first angle towards the first side of said blade of the high security master key at the imaging position. A second light source may be positioned to direct light at a second angle towards the first side said blade of the high security master key at the imaging position, wherein said captured image reveals surface features formed into the face of at least a portion of said blade. A logic may be configured to analyze the at least one captured image to determine characteristics of said surface features. The logic may further compare said characteristics of said surface features with cut code data of known lock styles. The cut code data may includes at least one of spacing dimensions and cut positions. The logic may determine at least one cut position or at least one cut code of said high security master key. The cut position or said cut codes may be used to replicate a high security key from a key blank. The high security master key may be a sidewinder key. The first and second light sources may be controlled to be individually turned on and off to direct light onto the surface of the high security master key. The imaging device may capture a plurality of images of the high security master key each from different illumination scenarios.

A backlight may be positioned to direct light towards the second side, opposite the first side of the blade of the high security key, the backlight may be configured for use with the logic for determining one or more of identifying the master key type, verifying if the master key is stationary, and determining the orientation of the master key. At least one of the first light source and the second light source may direct collimated light towards the imaging position. The high security key may includes a pathway formed onto said blade of said high security master key. The logic may analyze said characteristics of said surface features in order to determine the formed pathway on the surface of said master key. The determined formed pathway may be used to replicate the high security master key on a key blank.

In one embodiment, a third light source may be positioned to direct light at a third angle towards the first side of said blade of the high security master key at the imaging position, and a fourth light source may be positioned to direct light at a fourth angle towards the first side of said blade of the high security master key at the imaging position. The first angle, the second angle, the third angle, and the fourth angle may be different relative to horizontal axis of the imaging position.

In a further embodiment as illustrated by the Figures, provided is a method for scanning a high security master key, said method comprising illuminating surface features formed onto a first side of a blade of said high security master key from a first angle. The surface features formed onto the first side of said blade of said high security master key may be illuminated from a second angle, the first angle may be different than the second angle with respect to a horizontal imaging position axis. At least one image of a portion of the illuminated surface of the blade of said high security master key may be captured. Characteristics of said surface features may be determined, the characteristics of said surface features may be compared with cut code data of known lock styles. At least one cut code for said master key may be determined. The at least one cut code may be utilized to replicate said master key.

In one embodiment, the step of illuminating surface features from a first angle may be provided by a first light source and the step of illuminating surface features from the second angle may be provided by a second light source wherein the first light source and second light source are controlled to be on or off to create different illumination angles before capturing at least one image. A plurality of images may be captured, each with different illumination scenarios. The surface features may be determined with a logic that is configured to analyze a plurality of images with said different illumination scenarios. The surface features may include a pathway formed onto said blade of master key. The characteristics of said surface features may be compared with cut position data of known lock styles. At least one cut position may be determined for said master key. The cut positions may be represented by physical measurement values, the measurement values being determined by the logic. The high security master key may be replicated by using said measurement values. The characteristics of said surface features may be analyzed in order to measure a formed pathway on the surface of said high security master key. The high security master key may be replicated by using said measurement values. Backlighting may be used to illuminate the high security master key and a proper key blank associated with the high security master key may be identified.

DESCRIPTION OF THE DRAWINGS

Objects and advantages together with the operation of the invention may be better understood by reference to the following detailed description taken in connection with the following illustrations, wherein:

FIG. 4A is an exploded rear perspective view of an embodiment of a scanning system configured to capture an image of the shape of the features cut into the surface of a high security key blade;

FIG. 4B is an exploded front perspective view of the scanning system of FIG. 4A configured to capture an image of the shape of the features cut into the surface of a high security key blade;

FIG. 9A illustrates a top view of a high security key blade imaged without applying an image processing technique;

FIG. 9B illustrates a top view of the high security key blade of FIG. 9A imaged with an image processing technique wherein threshold levels are utilized to highlight the shape of the features cut into the surface of a blade;

FIG. 12A illustrates a perspective view of a key duplication machine with an integrated scanning system configured to capture an image of the shape of the features formed into the surface of a high security key blade and duplicate the key shape on a key blank;

FIG. 12B illustrates a partial perspective view of a key duplication machine with an integrated scanning system configured to capture an image of the shape of the features formed into the surface of a high security key blade and duplicate the key shape on a key blank;

FIG. 12C illustrates a perspective view of a key duplication machine with an integrated scanning system configured to capture an image of the shape of the features formed into the surface of a high security key blade and duplicate the key shape on a key blank.

DETAILED DESCRIPTION OF THE INVENTION

Reference will now be made in detail to exemplary embodiments of the present invention, examples of which are illustrated in the accompanying drawings. It is to be understood that other embodiments may be utilized and structural and functional changes may be made without departing from the respective scope of the present invention.

Provided is a system 100 and method for scanning surface features of high security type keys are provided. The system analyzes a high security master key to be duplicated, such as a high security house key, high security car key or other high security key, and determines the appropriate data required to duplicate the features of the key onto a high security key blank. The system and method described herein may be used independently to scan a high security key, or may be used in conjunction with other systems to duplicate a high security key.

Figure 1:
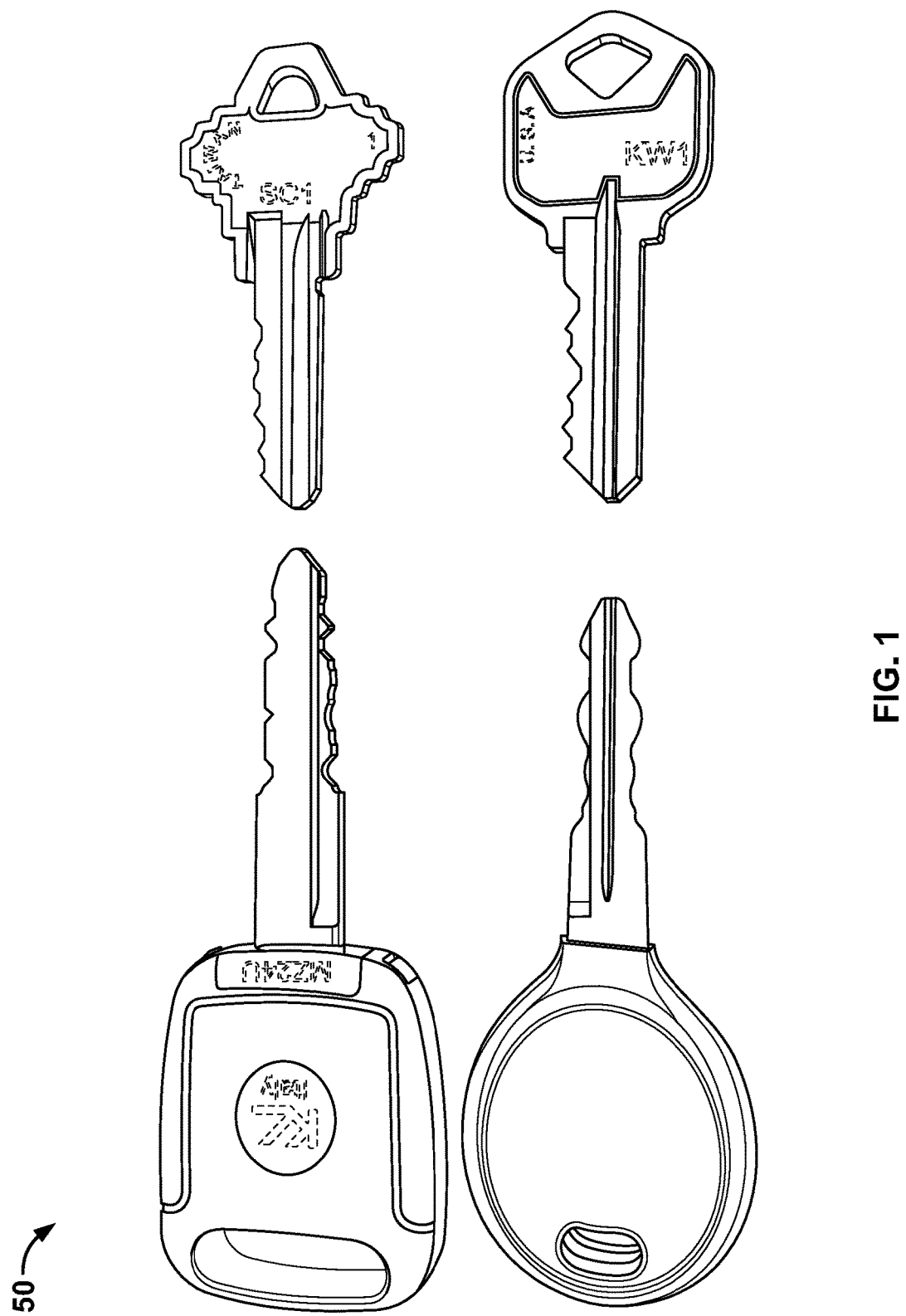
FIG. 1 illustrates examples of standard cut keys that utilize traditional key duplicating equipment.
Figure 2:
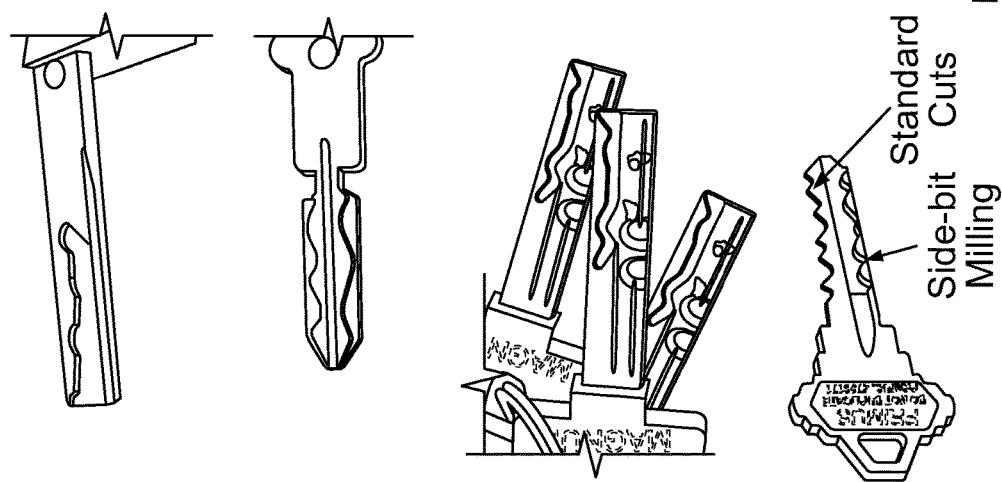
FIG. 2 illustrates examples of high security keys that utilize features cut into the surface of the blade.
Figure 2:
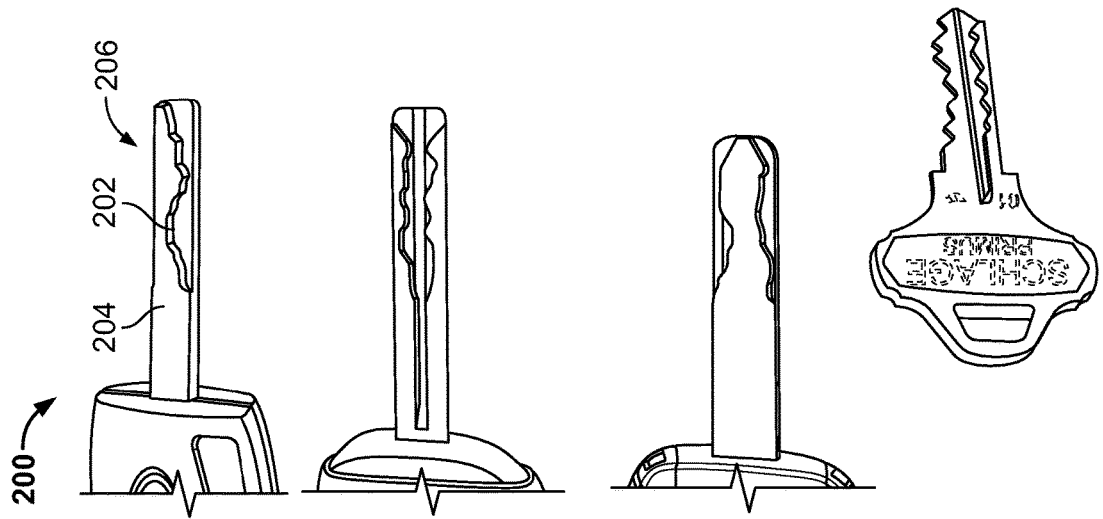
Figure 3:
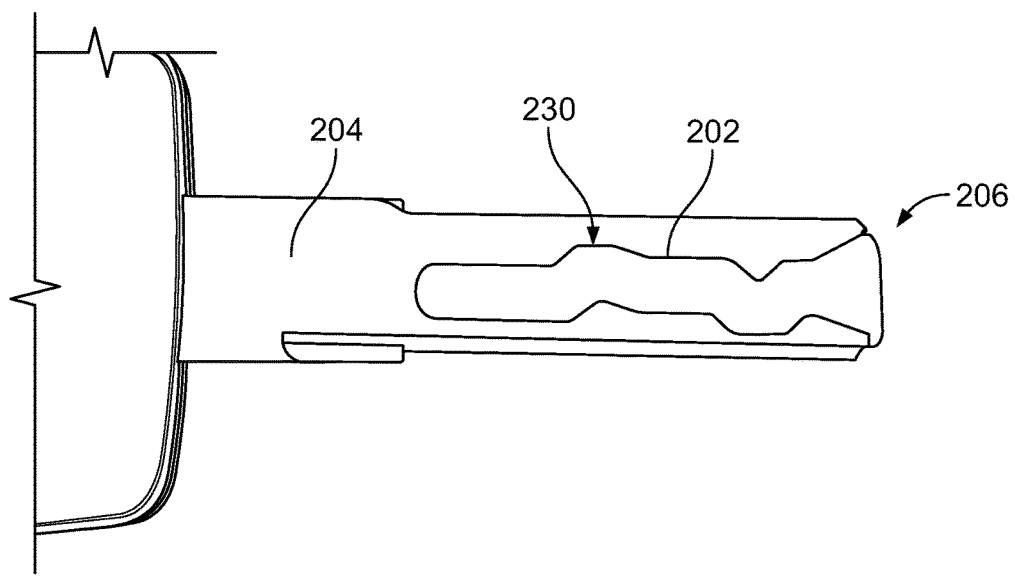
FIG. 3 illustrates an example of a typical internal cut high security key and highlights the geometry to be measured.

FIG. 1 illustrates standard keys 50 with bittings formed about an exterior profile of a key blade. FIG. 2 illustrates various embodiments of high security type keys 200 in which this system and method are capable of scanning, imaging and duplicating. Notably, the system and method may also be used for scanning the surface of standard keys. In the preferred embodiment, the scanning system analyzes characteristics of the surface features 202 formed into a face 204 of a blade 206 of the master keys 200 (FIG. 2). The surface features 202 may include of a pathway formed down the middle of the face of the blade, single pathway formed near one edge of the face of the blade, a pair of opposing pathways formed near the edges of the face of the blade, dimples formed into the face of the blade, notches formed into the face of the blade, or other geometric features formed or otherwise shaped into the face of the blade that interface with the components of a corresponding lock. The "formed pathway" may include a pathway formed down the middle of the face of the blade, single pathway formed onto the face of the blade, a pair of opposing pathways formed near the edges of the face of the blade These features may exist on just one side of the blade or may exist on both sides of the blade. The profile of the contour formed into the high security key blade face or faces are configured to mate with security component of an associate lock that may be a unique configuration. Once the high security key interfaces with the security features of the lock the key head may be turned to retract a security feature such as a bolt. FIG. 3 illustrates an embodiment of a geometric profile 230 having surface features 202 formed into the face 204 of the blade 206 of the master key that is to be measured/scanned by the disclosed system.

In a preferred embodiment, the system 100 may utilize 2D imaging techniques. For example, the scanning system 100 may utilize some combination of object coating techniques, illumination techniques, filtering techniques, image processing techniques, and feature extraction techniques to scan and analyze the physical characteristics of the master key. Other embodiments include the use of 3D imaging techniques such as stereoscopic imaging, triangulation techniques such as laser dot, laser stripe, structured light, modulated light, or any other imaging technique in order to scan the surface geometry. The imaging system may also be non-light based such as by using ultrasound or x-ray techniques. As illustrated by FIGS. 4A and 4B, the image system 100 may include an image capturing device 110 and may include at least one mirror 120 wherein the image capturing device may be aligned with the mirror to align an optical path 112 with a master key 200 at an imaging position 125.

In one embodiment, the optical imaging device 110 is a camera, and the image captured is a photographic image. In an embodiment, the camera is a digital camera, and the image captured is a digital image. A digital image may be stored in file form or in data form and may be analyzed by logic. While the scanning system is described herein as including an imaging system, it will be appreciated that other systems known in the art may be used to analyze the parameters of the master key. For example, the scanning system may use feeler gauges, capacitive sensors, probes, or other electro-mechanical measuring device. The scanning system may also be integrated with an antenna that reads a transponder on the high security keys.

As used herein, the term "logic" includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics. In addition, as used herein, the term "database" includes a physical and/or logical entity that can store data. A database may be, for example, a traditional database, a table, a file, a list, a queue, a heap, a memory, a register, and so on. A database may reside in one logical and/or physical entity and/or may be distributed between two or more logical and/or physical entities. The processing logic may be assembled using techniques, algorithms, packages and other capabilities known in the field.

The scanning system may include a database to store key related information ("key data"). The key data may include characteristics of known high security keys, such as key length, key shape, surface geometry shapes, and other characteristics. The database may associate the key data with specific key blanks or with types or groups of keys. For example, the database may store key data for different key manufacturers. The scanning system may access the database to compare scanned characteristics of the master key with the stored key data in the database. Such comparison may be used to determine the data needed to properly replicate the unique geometry of the master high security key onto a new high security key blank.

In an embodiment, the database stores key data related to cut codes used with known lock styles. For standard cut keys 50, the cut code data is called bitting data and is made up of spacing and depth dimensions that are associated with the mating pins in the lock. For high security keys 200, such cut code data is called cut position data and is made up of spacing and cut position dimensions that are associated with the mating components of the high security lock. For any particular lock style, the spacing between mating components may not vary. As such, each master key may only vary in the cut position at each spacing position. The cut codes for a particular master key are used to document the cut position at each known spacing position. Traditionally, cut codes are represented as a numeric or alpha-numeric code that contains information as to how a key is to be cut by a code cutting machine. Often, the cut code is a series of letters and/or integers (e.g. "K263") that may be translated or decoded from a key code chart or cut code list. The code also may be represented by a series of cut positions that define the shape of the cut at the spacing positions on each side of the key in order to operate the lock. These cut positions may be represented by integer codes (e.g. "331351" and "266431") or may be represented by physical measurement values (e.g. "0.285, 0.285, 0.313, 0.285, 0.256, 0.313 inches" and "0.299, 0.242, 0.242, 0.270, 0.285, 0.313 inches").

It will be appreciated that the database is not limited to key data and cut code data. In addition, the database may store information related to other identifying parameters of the key. The measuring system may utilize other key parameters, in combination with cut information, to narrow the field of possible key blanks.

In a preferred embodiment, the imaging system 100 may be used to analyze the master high security key 200 and determine the data required to duplicate the key. The imaging system 100 may utilize a combination imaging techniques to properly analyze the physical characteristics of the master key. Such imaging techniques include object coating techniques, illumination techniques, filtering techniques, image processing techniques, and feature extraction techniques.

Figure 5:
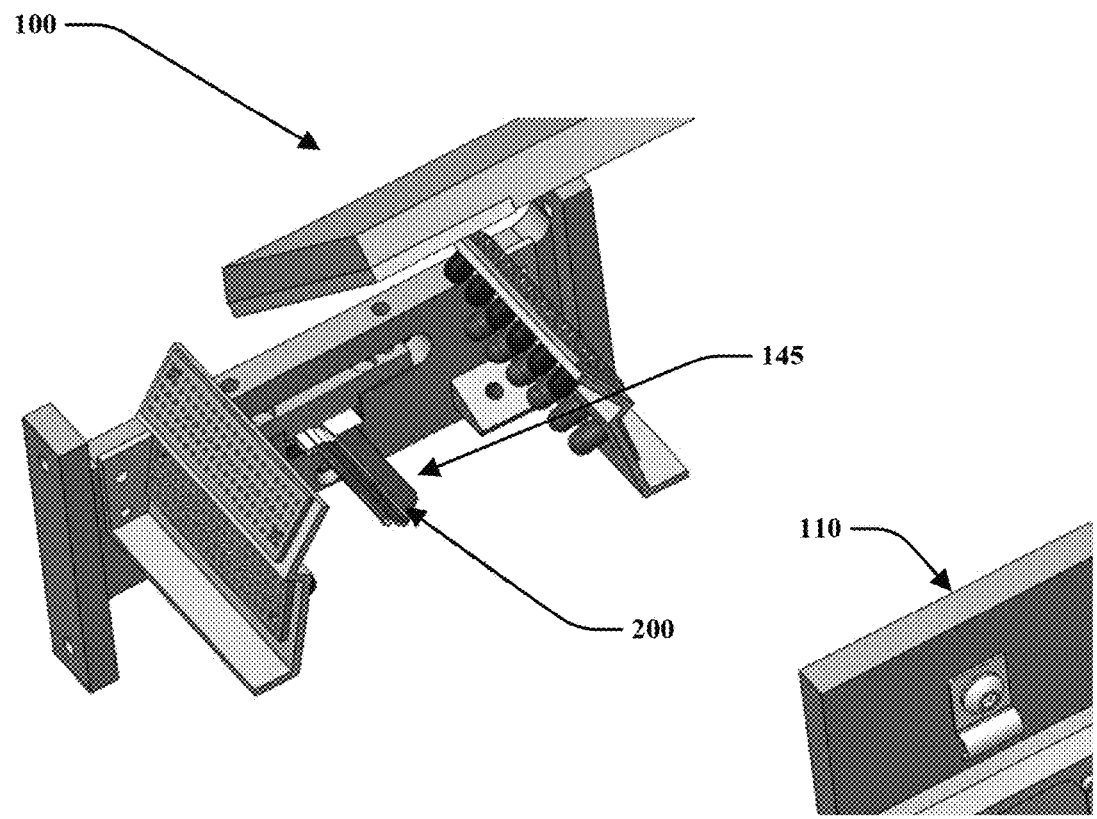
FIG. 5 is a perspective view of an embodiment of a scanning system wherein an object coating technique may be utilized to reduce spectral reflections on a surface of a high security key blade.

As illustrated by FIG. 5, the imaging system 100 may include the application of a coating 145 on a surface of the master high security key 200 in order to eliminate various spectral reflections. This may improve the quality of the data retrieved from the image. Such coatings may include a powdered or liquid material and could be applied with a coating process such as spraying, electrochemical deposition, or roll application. The coating 145 could also be a thin layer of material applied to the surface of the high security key induced by cooling the blade with a refrigerant.

Further, as illustrated by FIGS. 4A, 4B, 7A, and 7B, the imaging system 100 may utilize illumination techniques to highlight the surface geometry of the blade 206 of the high security key 200 to be scanned. In particular, various types of light sources as well as various positions of the light source relative to the image position 125 may be utilized. For example, various color light sources can be used to highlight certain features on the master key blade 200. The master key may be positioned at the imaging position 125 wherein a first light source 130A and a second light source 135A are also positioned to direct light at the imaging position 125 to allow various light types and angles illuminate a first side 155 of the high security key 200 as it is positioned at the imaging position 125. Further, a third light source 130B and a fourth light source 135B may also be positioned to direct light towards the first side 155 of the high security key 200 at the imaging position 125 to allow various light types and angles illuminate the first side 155 of the high security key 200. The first light source 130A may be a bright field lighting while the second light source 135A may be dark field lighting. Additionally, the third light source 130B may be a bright field lighting while the fourth light source 135B may be dark field lighting. However, any combination of bright field lighting and the dark field lighting may be providing by any combination of the first, second, third, and fourth light sources, and this disclosure is not limited here. The first light source 130A may include at least one first top light 132 which may include a row of lights. The first top light 132 may be positioned adjacent a first side 150 of the imaging position 125 to direct light towards the first side 155 of the high security master key 200 at the imaging position 125. The third light source 130B may include at least one second top light 134 which may include a row of lights. The second top light 134 may be positioned adjacent an opposite second side 160 of the imaging position 125 to direct light towards the first side 155 of high security master key 200 at the imaging position 125.

The second light source 135A may include at least one first bottom light 142 which may include a row of lights. The first bottom light 142 may be positioned adjacent the first side 150 of the imaging position 125 to direct light towards the first side 155 of the high security master key 200 at the imaging position 125. The fourth light source 135B may include at least one second bottom light 144 which may include a row of lights. The second bottom light 144 may be positioned adjacent the opposite second side 160 of the imaging position 125 to direct light towards the first side 155 of the high security master key 200 at the imaging position 125.

The first and second top lights 132, 134 and the first and second bottom lights 142, 144 may be configured to allow the optical path 112 to traverse through the system 100 and reflect off the mirror 120 to capture an image of the master key 200 as it is positioned at the imaging position 125. The lights and positions of the lights allow for the optical path 112 to be uninterrupted from view of the imaging position 125. Further, in one embodiment, the lights or the row of lights may be positioned to provide collimated light towards the first side 155 of the high security master key 200 at various angles.

The first light source 130A may be angled towards the imaging position 125 at a first angle A relative to a horizontal imaging position axis 172. The imaging position axis 172 may be the axis that is horizontal relative to the center of the imaging position 125. See FIG. 7B. The second light source 135A may be angled towards the imaging position 125 at a second angle B relative to the horizontal imaging position axis 172. The third light source 130B may be angled towards the imaging position 125 at a third angle C relative to the imaging position axis 172. The forth light source 135B may be angled towards the imaging position 125 at a fourth angle D relative to the imaging position axis 125. The fourth angle D may be greater than the third angle C which may be greater than the second angle B which may be greater than the first angle A relative to the horizontal imaging position axis 172. The first and second top lights 132, 134 may be positioned further away from the imaging position 125 than the first and second bottom lights 142, 144.

The position and angle of the first, second, third and fourth light sources may also be identified in reference to vertical imaging position axis 170. In one embodiment, the first and second top lights 132, 134 may be generally symmetric with one another relative to the axis 170. Also, the first and second bottom lights 142, 144 may be generally symmetric with one another relative to the axis 170. In another embodiment, the first and second top lights 132, 134 may not be generally symmetric with one another relative to the axis 170. Also, the first and second bottom lights 142, 144 may not be generally symmetric with one another relative to the axis 170. In yet another embodiment, the system may include multiple levels of light sources such as top, middle, bottom, etc. This disclosure contemplates various arrangements and configurations of the light sources relative to the imaging position 125 and is not limited in this regard.

In some cases, diffused light can be used to eliminate shadows caused by the surface features 202 formed into a face 204 of a blade 206 of the master keys 200. In other cases, non-diffused or collimated light can be used from particular angles to highlight certain surface features 202 by creating shadows. By illuminating an object with collimated light from a number of different angles, a number of different types of surface features can be highlighted with respect to their shadow. An image can then be collected and processed for each different illumination angle in order to properly analyze all the surface features and geometry. Axially diffused light can be used to accent certain feature types. Infrared light can also be used as a light source in order to eliminate reflections and diminish color variation. The light sources 130A, 130B, 135A, 135B may be operated to create collimated light from different illumination angles relative to the imaging position 125 and the key positioned there. Each of the lights or rows of lights 132, 134, 142, 144 may be controlled to provide various colors and intensities of light towards the imaging positions to manipulate an image of the master key 200.

Further, a backlight 175 may be provided in the system 100. The backlight 175 may direct light towards a second side 156 of the high security master key 200 at the imaging position 125. The second side 156 of the key 200 may be opposite from the first side 155. The backlight 175 may be positioned adjacent on opposite side of the imaging position 125 relative to the light sources 130A, 130B, 135A, and 135B. The backlight 175 may be positioned opposite from the direction of the optical path 112 relative to the master key 200. The backlight 175 may provide illumination behind the master key and be turned on and off. The backlight illumination may be utilized with the logic for identifying the master key type, verifying if the master key is stationary, and determining the orientation of the master key.

It can be appreciated that multiple images may be gathered with different illumination scenarios. For example, the light sources may be moved or the key can be moved to create the desired angles. Additionally, multiple light sources may be used to create multiple illumination scenarios by operating various lights as desired. Further, various different types of light sources, such as different-colored lights, bright light fields, and dark light fields from different angles may be utilized, to gather multiple sets of illuminated images from an image capturing device located at a static position. Such an approach may utilize color filters in logic to create a set of images that represent each individual illumination angle. This multi-color technique reduces the system complexity and creates an absolute registration within the set of images.

Figure 6A:
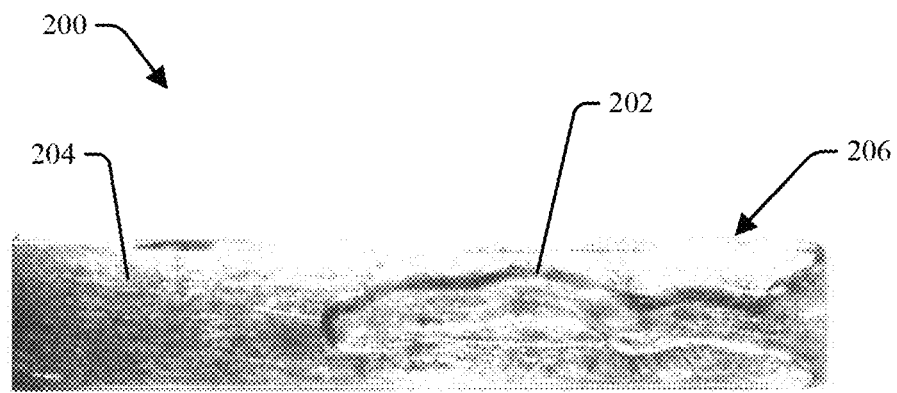
FIG. 6A illustrates a top view of a high security key blade imaged with an illumination technique without using collimated lighting.
Figure 6B:
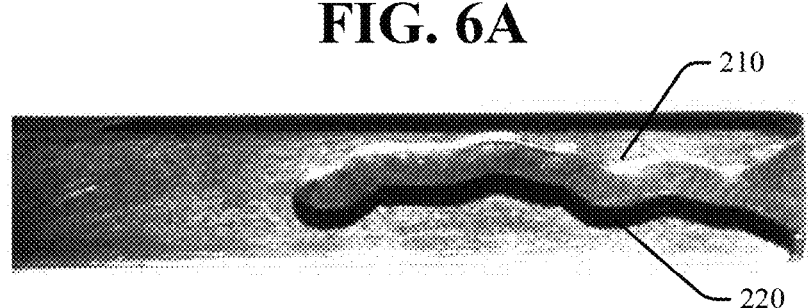
FIG. 6B illustrates a top view of the high security key blade of FIG. 6A that has been imaged with an illumination technique using collimated lighting from a first angle used to highlight the shape of the features cut into the surface of the high security key blade.
Figure 6C:
FIG. 6C illustrates a top view of the high security key blade of FIGS. 6A and 6B that has imaged with an illumination technique using collimated lighting from a second angle used to highlight the shape of the features cut into the surface of the high security key blade.
Figure 7A:
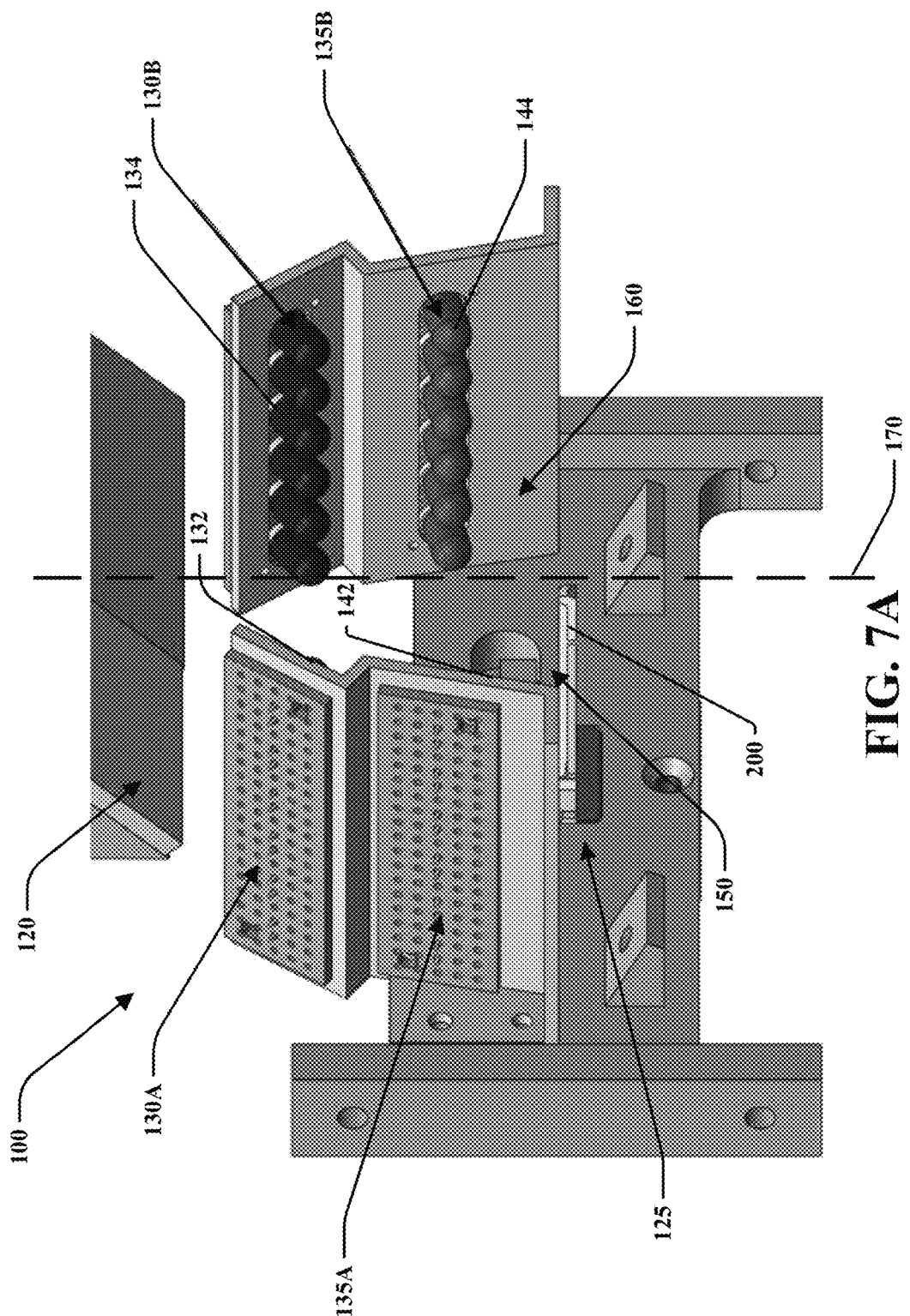
FIG. 7A is a perspective view of a scanning system wherein a plurality of light sources may be utilized to gather multiple sets of illuminated images.
Figure 7B:
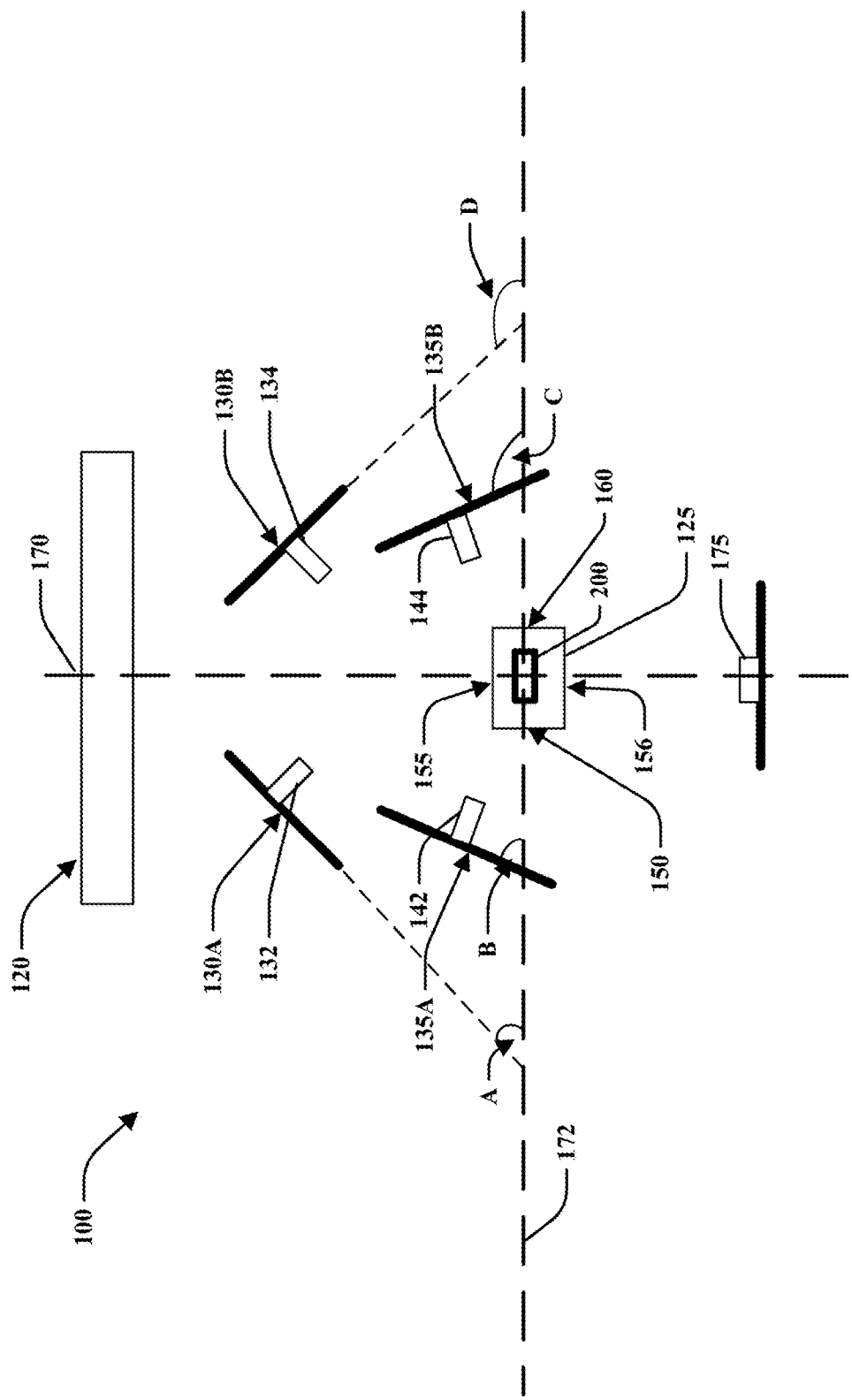
FIG. 7B is a schematic view of the scanning system of FIG. 7A illustrating a plurality of light sources relative to a common axis.

FIGS. 6A, 6B, and 6C illustrate various images of high security keys 200 taken with and without collimated angles. FIG. 6A illustrates a top view of a blade 206 of a high security key 200 having a particular surface feature 202 imaged with an illumination technique without using collimated lighting. FIG. 6B illustrates the high security key of FIG. 6A that has been imaged with an illumination technique using collimated lighting from a first angle used to highlight the shape of the surface features 202 cut into the face 204 of the high security key blade 206. This image illustrates a shadow effect along the bottom portion 220 of the surface features 202 and a more bright illumination effect along the top portion 210 of the surface features 202. In one embodiment, the image of FIG. 6B may be taken having light provided from the first top light 132 of the first light source 130A while the first bottom light 142, the second top light 134, and the second bottom light 144 do not provide light.

FIG. 6C illustrates the high security key of FIG. 6A that has been imaged with an illumination technique using collimated lighting from a second angle used to highlight the shape of the surface features 202 cut into the face 204 of the high security key blade 206. This image illustrates a shadow effect along the top portion 210 of the surface features 202 and a more bright illumination effect along the bottom portion 220 of the surface features 202. In one embodiment, the image of FIG. 6C may be taken having light provided from the second top light 134 of the third light source 130B while the second bottom light 144, the first top light 134, and the first bottom light 144 do not provide light.

This method is an example of capturing various images of the master key 200 with various directions of light from various angles toward the imaging position 125. The images may then be processed through a logic system to identify the pronounced portions of the surface features 202. These processes allow for increased efficiency and accuracy related capturing data related to the geometric pattern of the surface features 202.

Figure 8:
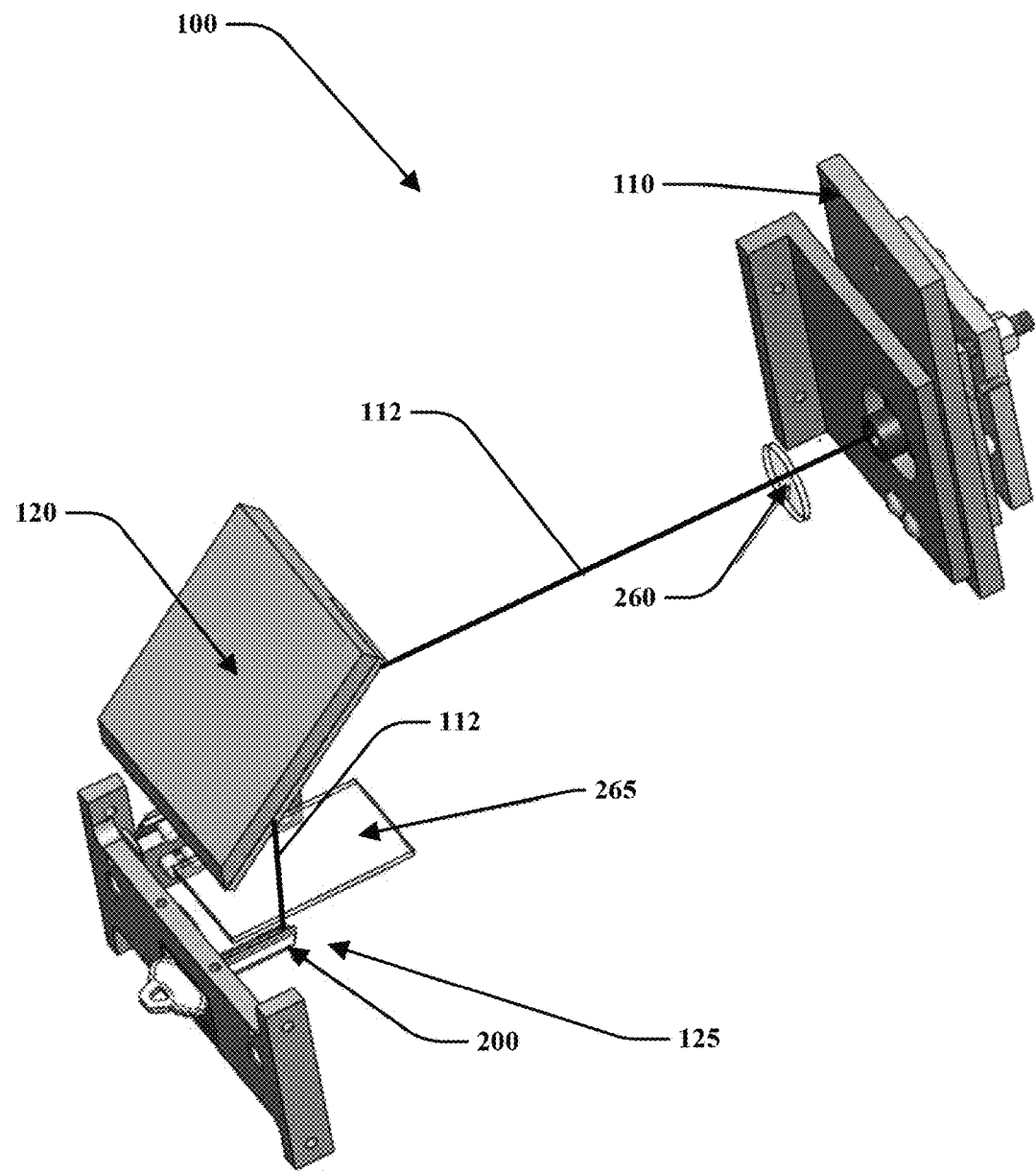
FIG. 8 is an exploded perspective view of a scanning system wherein filtering techniques such as polarization may be utilized to highlight a shape of the features cut into a surface of a key blade.

As illustrated by FIG. 8, in one embodiment, the imaging system 100 may include a first filter 260 and a second filter 265. The filters may be aligned along the optical path 112 of the imaging device 110. Filtering techniques of the logic may enhance the contrast of the surface features 204 of the master key 200. The filters 260, 265 may include a lens that may include color, interference, neutral density, and polarization. Color filters can enhance the contrast of certain colors and decrease that of other colors. Interference filters can also be used to enhance certain bands of light. Neutral density filters may be used to reduce the overall brightness if the image. Polarization filters may be used to reduce specular reflections. In some cases, both the light source from the first or second light fields 130, 135 and the lens of the imaging device 110 may have polarizing filters 260, 265. While filtering techniques typically involve physical lenses, it will be appreciated that digital techniques can also be utilized to produce filtering effects in logic. In one embodiment, the first filter may be positioned adjacent to the imaging device 110 while the second filter 265 may be positioned adjacent the mirror 120 or the imaging position 125.

Additionally, image processing techniques may be used to highlight the surface geometry to be scanned. As illustrated by FIGS. 9A and 9B, such techniques may include digital image processing functions to adjust such things as exposure, brightness, contrast, hue, saturation, high pass filtering, low pass filtering, threshold level adjustments, and multi-image comparisons including image masking, overlaying, and other pixel-by-pixel functions. These techniques are typically applied to either the entire image or selected region of interest. FIG. 9A illustrates a top view of a blade 206 of a master key 200 having a particular surface feature 202 imaged with an illumination technique without being processed through use of the various image processing techniques. FIG. 9B illustrates the high security key of FIG. 9A that has been imaged with an illumination technique wherein a threshold processing technique has been applied to capture accurate geometric shapes of the surface features 202 cut into the face 204 of the high security key blade 206. This image illustrates a threshold effect along the top portion 210 and the bottom portion 220 of the surface features 202. In one embodiment, the image of FIG. 9B is the result of the processing techniques applied to the image of FIG. 9A.

Figure 10:
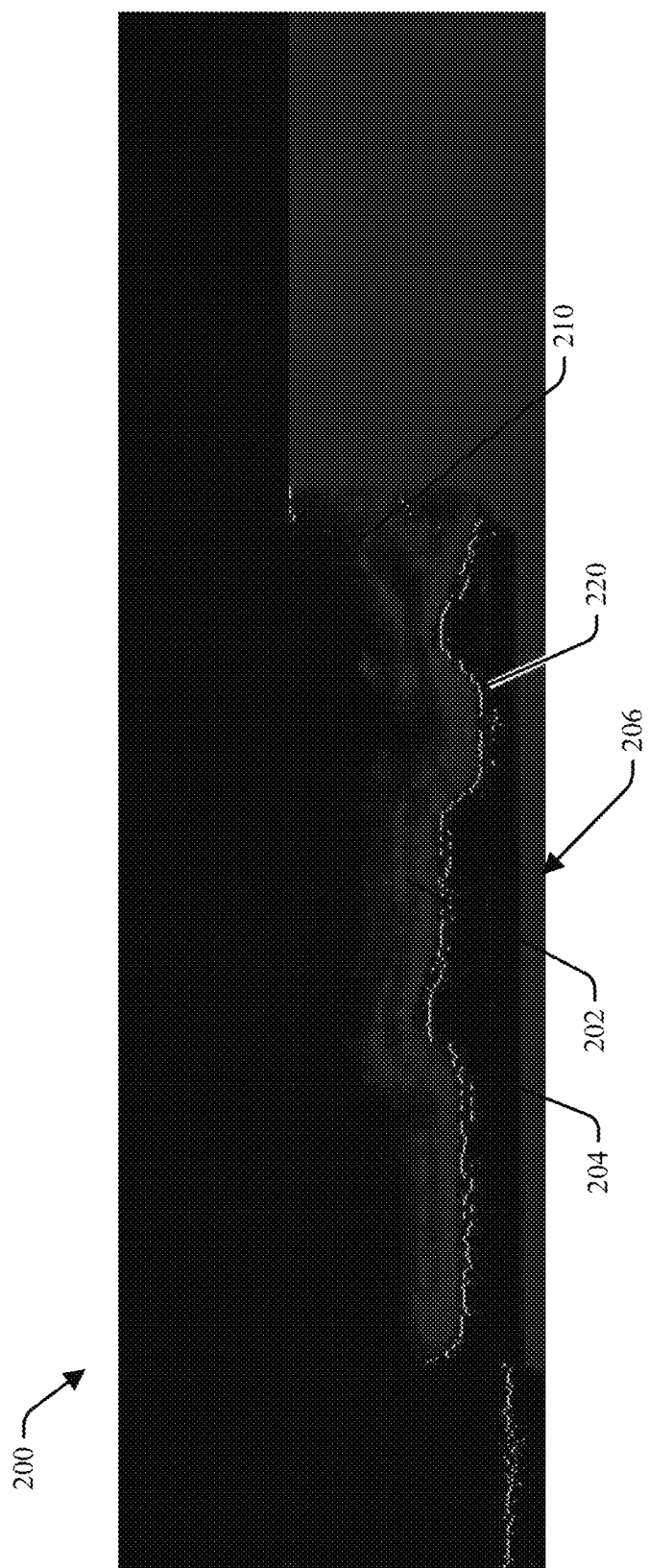
FIG. 10 illustrates a top view of a high security key blade imaged with a feature extraction technique such as edge detection that may be utilized to highlight the shape of the features cut into the surface of a blade.

The imaging system 100 may use feature extraction processing techniques such as edge detection, blob analysis, and pattern recognition to analyze the highlighted geometry and determine the geometric shape of the desired features. In one embodiment, illustrated by FIG. 10, edge detection may be used to highlight the edge 220 of the surface feature 202. In another embodiment, pixel by pixel gradient detection can be used to identify edges of highlighted features along the surface features 202. In one preferred embodiment, a form of blob analysis may be utilized to isolate the edge points that represent the outline of the highlighted surface feature. Ordered lists of these points may then be processed to generate the position registration and edge data. Mathematical abstractions such as splines, Fourier analysis, neural nets, Hadamard transforms, and Hough transforms can be utilized to enhance the data analysis.

Figure 11:
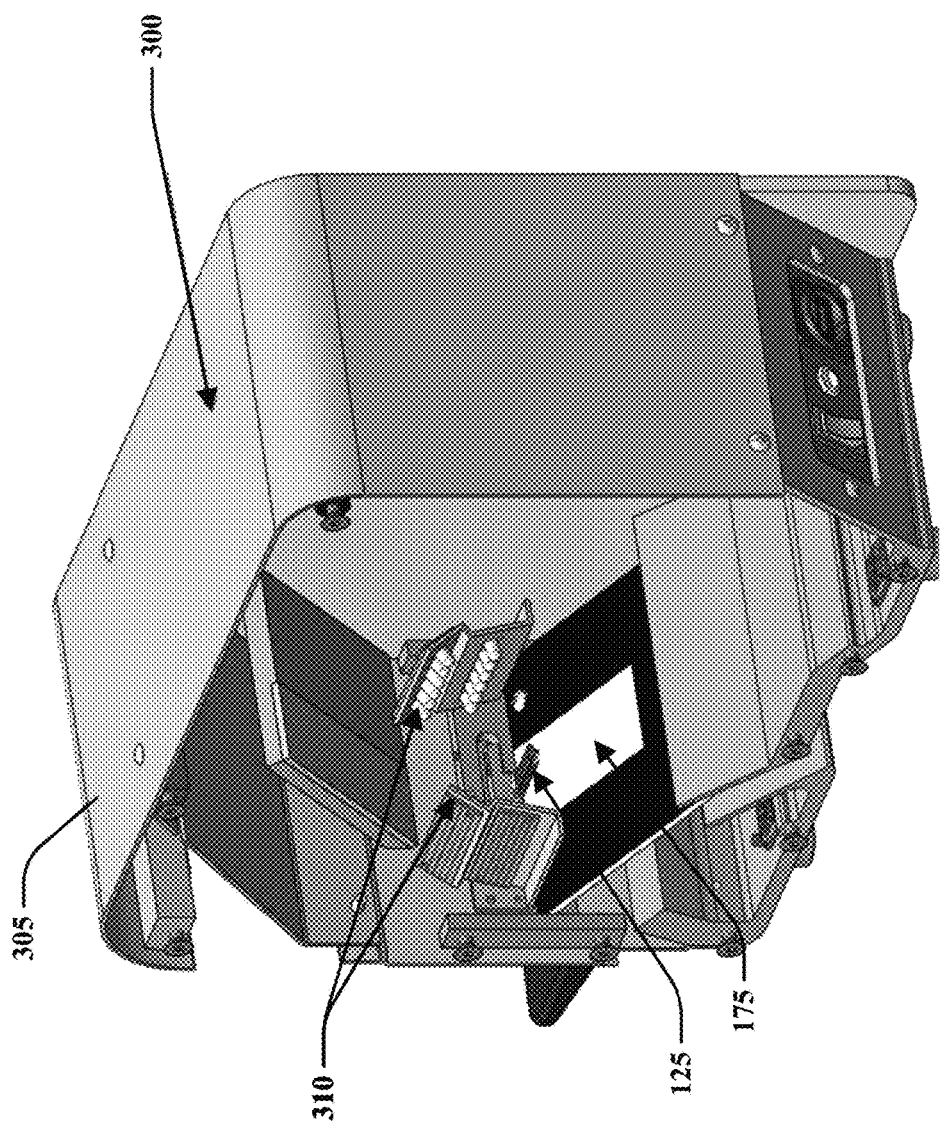
FIG. 11 is a perspective view of an embodiment of a key scanning machine configured to capture an image of the shape of the features cut into the surface of a blade.

The scanning system 100 may be utilized to function as a key data capture device configured to measure the shape of the features cut into the surface of a high security key blade and determine the data needed to make a copy of the master key. Such key data capture device may be part of a key identification machine or key scanning machine 300 as illustrated by FIG. 11. This machine 300 may include a housing that has a plurality of light sources 310 angled towards the imaging position 125. The machine 300 may be equipped with a plurality of light sources that may include bright and dark field lighting and may be configured to measure the shape of the surface features of the master key. The machine 300 may be configured to identify the proper key blank and determine the data needed to make a copy of the master key. This data can then optionally be used by a separate key cutting machine or key duplicating machine to cut a high security key blank in order to duplicate the master key.

The scanning system 100 may also be integrated into a key scanning and duplication machine 400 as illustrated by FIGS. 12A, 12B, and 12C. For example, the scanning system 100 may be used in conjunction with a key duplication system, such as the key duplication machine disclosed in U.S. Pat. No. 7,891,919, which is hereby incorporated by reference in its entirety. Such a system would be able to help identify the proper key blank, determine the data needed to make a copy of the master key, and cut a high security key blank in order to duplicate the master key. Further, the scanning system 100 may be used in conjunction with the systems disclosed in U.S. Pat. Nos. 8,644,619; 8,634,655; 7,890,878; and 9,101,990 which are hereby incorporated by reference in their entirety.

Figure 13:
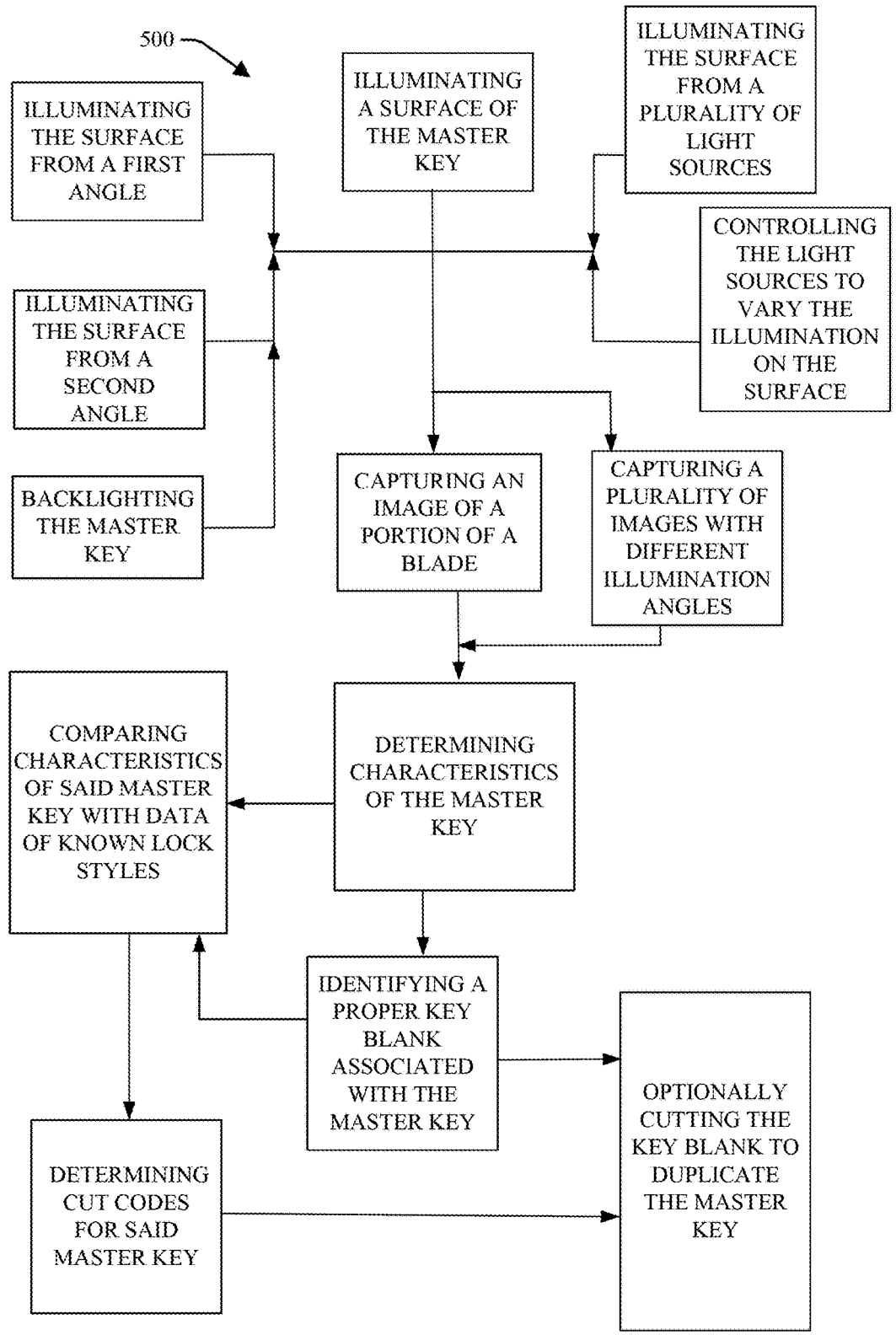
FIG. 13 is a flow chart that illustrates an embodiment of a method for utilizing electronic means for reading the unique features cut into the surface of the blade of a key such as a high security key and providing that data to a key duplicating machine.

As described above, provided is a method of scanning a master key 500. The method is illustrated by the flow chart illustrated by FIG. 13. The method includes the steps of illuminating surface features formed onto a blade of said master key from a first angle A. Surface features formed onto the blade of said master key may be illuminated from a second angle B. The first angle A may be different than the second angle B with respect to an imaging position axis 175. At least one image of a portion of the blade of said master key is captured. Characteristics of said surface features are determined. Logic may be utilized to determine the characteristics of the surface features and to analyze the images captured of the blade. The logic may be used to compare the characteristics of said surface features with cut code data of known lock styles. The logic may also be used to determine at least one cut code for said master key. The at least one cut code may be utilized to replicate said master key. The surface features 202 include a pathway 230 formed onto said blade of master key 200. The surface features may be illuminated from the first angle A provided by a first light source 130A. The surface features may be illuminated from the second angle B provided by a second light source 135A. The first light source 130A and second light source 135A may be controlled to be toggled on or off to create different illumination angles before the imaging device 110 captures an image. The imaging device 110 may capture a plurality of images wherein each image includes a different illumination scenario provided by at least one of the light sources 130A, 130B, 135A, and 135B and the backlight 175. The surface features may be determined with logic configured to analyze a plurality of images each image including the different illumination scenario.

Further, characteristics of said surface features may be compared with cut positions of known lock styles. This comparison may be performed by the logic wherein said cut positions may be represented by physical measurement values. The measurement values may also be determined by the logic. A master key may be replicated by using said measurement values. Alternatively, the logic may analyze said characteristics of said surface features in order to measure a formed pathway 230 on the surface of said master key. The formed pathway 230 may be represented by physical measurement values.

Further, a backlit image may be captured. The logic may analyze said backlit image and compare it with a database of known key blanks A proper key blank associated with the master key may be identified by the logic and communicated to the user or utilized to identify the proper cut code data for the associated master key.

While the invention has been described with respect to scanning surface features on high security keys, it use is in no way limited to just surface features or just high security keys. Many of the inventive ideas can be utilized on outer edge features and standard, edge-cut household and automotive keys.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. A high security key scanning system comprising:
an imaging device configured to capture at least one image of a portion of a first side of a blade of a high security master key,
a first light source positioned to direct light at a first angle towards the first side of said blade of the high security master key at an imaging position;
a second light source positioned to direct light at a second angle towards the first side of said blade of the high security master key at the imaging position;
a third light source positioned to direct light at a third angle towards the first side of said blade of the high security master key at the imaging position;
a fourth light source positioned to direct light at a fourth angle towards the first side of said blade of the high security master key at the imaging position;
wherein the first angle, the second angle, the third angle, and the fourth angle are different relative to a horizontal axis of the imaging position;
wherein said captured image reveals surface features formed into a face of at least a portion of said blade;
wherein the light sources are controlled to create different illumination scenarios onto the surface of the high security master key;
wherein said imaging device captures a plurality of images of the high security master key each from different illumination scenarios; and
a logic configured to analyze the plurality of captured images to determine characteristics of said surface features.

2. The key scanning system of claim 1, wherein said logic further compares said characteristics of said surface features with cut code data of known lock styles.

3. The key scanning system of claim 2, wherein said cut code data includes at least one of spacing dimensions and cut positions.

4. The key scanning system of claim 2, wherein said logic determines at least one cut position or at least one cut code of said high security master key.

5. The key scanning system of claim 4, wherein said cut position or said cut codes are used to replicate a high security key from a key blank.

6. The key scanning system of claim 1, wherein said high security master key is a sidewinder key.

7. The key scanning system of claim 1, wherein the first and second light sources are controlled to be individually turned on and off to direct light onto the surface of the high security master key.

8. The key scanning system of claim 1, further comprises a backlight positioned to direct light towards a second side, opposite the first side of the blade of the high security master key, the backlight configured for use with the logic for one or more of identifying the high security master key type, verifying if the high security master key is stationary, and determining the orientation of the high security master key.

9. The key scanning system of claim 1, wherein at least one of the first light source and the second light source directs collimated light towards the imaging position.

10. The key scanning system of claim 1, wherein said high security master key includes a pathway formed onto said blade of said high security master key.

11. The key scanning system of claim 10, wherein the logic analyzes said characteristics of said surface features in order to determine the formed pathway on the surface of said high security master key.

12. The key scanning system of claim 11, wherein the determined formed pathway is used to replicate the high security master key on a key blank.

13. A method for scanning a high security master key, said method comprising:
illuminating surface features formed onto a first side of a blade of said high security master key from a first angle wherein the step of illuminating surface features from a first angle is provided by a first light source;
illuminating surface features formed onto the first side of said blade of said high security master key from a second angle, wherein the step of illuminating surface features from the second angle is provided by a second light source;
illuminating surface features formed onto the first side of said blade of said high security master key from a third angle, wherein the step of illuminating surface features from the third angle is provided by a third light source;
illuminating surface features formed onto the first side of said blade of said high security master key from a fourth angle, wherein the step of illuminating surface features from the fourth angle is provided by a fourth light source, wherein the first angle, the second angle, the third angle, and the fourth angle are different relative to a horizontal axis of an imaging position;
controlling the first light source, the second light source, the third light source, and the fourth light source to create different illumination scenarios onto the surface features of the high security master key;
capturing a plurality of images of a portion of the illuminated surface of the blade of said high security master key from different illumination scenarios; and
determining characteristics of said surface features.

14. The method of claim 13, further comprising comparing said characteristics of said surface features with cut code data of known lock styles.

15. The method of claim 13, further comprising determining at least one cut code for said high security master key.

16. The method of claim 15, further comprising utilizing said at least one cut code to replicate said high security master key.

17. The method of claim 13, wherein the step of illuminating surface features from a first angle is provided by a first light source and the step of illuminating surface features from the second angle is provided by a second light source wherein the first light source and second light source are controlled to be on or off to create different illumination angles before capturing at least one image.

18. The method of claim 13, wherein said surface features are determined with a logic that is configured to analyze the plurality of images with said different illumination scenarios.

19. The method of claim 18, further comprising comparing said characteristics of said surface features with cut position data of known lock styles.

20. The method of claim 19, further comprising determining at least one cut position for said high security master key.

21. The method of claim 20, wherein said cut positions are represented by physical measurement values, the measurement values being determined by the logic.

22. The method of claim 21, further comprising replicating said high security master key by using said measurement values.

23. The method of claim 13, wherein said surface features include a pathway formed onto said blade of said high security master key.

24. The method of claim 23, further comprising analyzing said characteristics of said surface features in order to measure the pathway on the surface of said high security master key.

25. The method of claim 24, further comprising replicating said high security master key by using said measurement values.

26. The method of claim 13, further comprising backlighting said high security master key.

27. The method of claim 26, further comprising identifying a proper key blank associated with the high security master key.

* * * * *